US006414594B1

United States Patent
Guerlain (10) Patent No.: US 6,414,594 B1
(45) Date of Patent: Jul. 2, 2002

(54) METHOD AND APPARATUS FOR USER-INITIATED ALARMS IN PROCESS CONTROL SYSTEM

(75) Inventor: Stephanie Anne Elisabeth Guerlain, White Bear Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 08/775,829

(22) Filed: Dec. 31, 1996

(51) Int. Cl.⁷ .............................................. G08B 29/00
(52) U.S. Cl. ...................... 340/506; 340/511; 340/525; 340/825.06; 701/81
(58) Field of Search ................................ 340/511, 525, 340/506, 825.06; 364/138, 141, 146, 148; 702/81; 345/418; 700/83

(56) References Cited

U.S. PATENT DOCUMENTS

| | | | | |
|---|---|---|---|---|
| 4,990,894 A | * | 2/1991 | Loescher et al. | 340/573.1 |
| 5,287,390 A | * | 2/1994 | Scarola et al. | 376/216 |
| 5,392,226 A | * | 2/1995 | Hamilton | 364/551.01 |
| 5,400,246 A | * | 3/1995 | Wilson et al. | 700/17 |
| 5,631,825 A | * | 5/1997 | Van Weele et al. | 364/188 |

OTHER PUBLICATIONS

"Integrated Vehicle Health Management System" Final Report, May 30, 1995, by K. Nelson,R.Penner, J. Cunningham,T.Gederberg,H.Nasr,R.Reid.

* cited by examiner

Primary Examiner—Daryl Pope
(74) Attorney, Agent, or Firm—Kris T. Fredrick (57) ABSTRACT

A user interface provides the operator of an industrial process control system the ability to set user-initiated alarms on selected parameters representative of a process being controlled, independent of predetermined alarm limits. The interface allows the operator to identify parameters to monitor, when to monitor the parameters, when to trigger alarms, and allows the operator to determine how to be notified that a user-initiated alarm has been triggered. A template having blanks to fill in information related to the alarm limits is provided and has drop down menus providing alternatives. Selecting an icon on a schematic representative of a process causes the template to pop up in a window type of environment with relevant data already filled in. The completion of the template results in a message being sent to a process module which provides real time values of the parameters.

23 Claims, 6 Drawing Sheets

METHOD AND APPARATUS FOR USER-INITIATED ALARMS IN PROCESS CONTROL SYSTEM

FIELD OF THE INVENTION

The present invention relates to process control, and in particular to the monitoring of parameters representative of a process.

BACKGROUND OF THE INVENTION

Typical industrial process control involves the use of a control system to monitor many process parameters. In the control of petrochemical, power, pharmaceutical and many other types of plants requiring process control, there can be several hundred parameters representative of flow, temperature, pressure and level, as well as many other parameters which are measured by sensors coupled to a computer based control system. The computer system may comprise a single processor, or as common in distributed process control, several processors which monitor the measured parameters, and provide process control signals to valves, pumps, motors, heaters and other devices which control the process being monitored. In addition, many predefined parameter limits are programmed into the computer system. When these limited are exceeded, alarms may be communicated to users called operators who monitor the operation of the process.

When setting up the computer system to control the process, process engineers configure the computer system with control programs to control the process as desired. Process engineers also set the alarm limits based on their detailed knowledge of the process to ensure that the process operates within safe and/or efficient limits. These alarm limits are not normally modifiable by an operator because they are usually set to be indicative of an unsafe condition. When an abnormal condition or situation in the process occurs such as during startup, or an overflow condition, there may be a long list of alarms that are currently being communicated to the operator. Alarms may be communicated by sound, blinking representations of parameters on one or more displays, messages or other forms of communication. The alarms may or may not be important depending on the condition. There are also computer screens of other information that are displayed, such as schematics/groups of process flow, overviews, and trends in addition to various forms of alarms. The operator may be busy trying to control the process, and be interested in one or more parameters that are not near a limit. The operator may be waiting to perform an action when one or more parameters reach values well within alarm limits. With potentially hundreds of alarms being communicated and hundreds of screens of information, it is difficult for the operator to monitor such parameters to know when to take another action to bring the process back under control or to follow a normal procedure.

Basic human nature also makes it difficult for a person to continuously track one or more parameters. In observed cases, operators have been known to leave doors open on strip chart devices to remind them that the process variables represented on the charts needed closer attention. In extreme cases, operators have been known to defeat security mechanisms and actually change the predefined alarm limits to monitor a process variable. This is potentially dangerous, as the predefined alarm limits are designed to provide warning for unsafe operation of the process which could lead to catastrophic results. Operators may neglect to tell the next shift about the change, or may themselves forget the prior limit or forget to set it back.

SUMMARY OF THE INVENTION

A user interface provides the operator of a process control system the ability to set user-initiated alarms on selected parameters representative of a process being controlled, independent of predetermined alarm limits. The interface allows the operator to identify parameters to monitor, when to monitor the parameters, when to trigger alarms, and allows the operator to determine how to be notified that a user-initiated alarm has been triggered.

In one embodiment, the operator interface comprises a computer program running on top of a window based operating system that operates on a user station attached to many process modules through various networks. The process modules monitor all parameters in real time and compare them to predetermined alarm limits which are set by engineers who initially configured the process control system. The operator interface permits the operators to select multiple parameters to monitor and to set the user-initiated alarm limits, as well as indicate the type of notification to be given when such a limit is triggered. Values of the parameter are obtained from the process module coupled to the device generating the parameter. The values are then compared to the selected alarm limits by the operator interface program running on the user station.

In a further embodiment, the process module performs the comparison for both the predefined limits and the operator-defined limits and generates predefined alarms for the predefined limits being exceeded, and generates user-initiated alarms for the operator selected limits being exceeded.

In a further embodiment, a list of parameters is provided in a graphical user interface format allowing the operator to point to and select parameters using any of a number of well known pointing devices such as a mouse. When a parameter is selected, a panel is provided showing selected information about the parameter, such as what it represents, and current fixed alarm limits if any. Further portions of the panel provide space for the operator to select desired operator limits and associated notification methods. Time limits for such notification may also be specified.

Parameters may also be selected by clicking on an icon representative of a sensor or device such as a valve in a schematic display. Control points or parameters to select are then displayed based on which are relevant to the valve.

In an alternative embodiment, a menu driven interface is provided such that the selection of parameters and operator specified alarm limits is performed by use of a standard keyboard.

Once the operator selects a parameter to be modified, it sends a message indicating the device, referred to as a point, to be monitored along with a time interval frequency indication ranging from 1 to 60 minutes. The process module monitoring the device generating the parameter receives the message and then proceeds to monitor the device at specified frequency. It provides the parameter value at each time interval, or only upon change if so specified, along with a point identifier in a broadcast message which the user station will pick up and perform alarm limit comparisons, as well as generate appropriate alarms. In the alternative embodiment where the process module does the monitoring, it merely sends an alarm as specified by the user. In yet a further embodiment, a network interface module which couples the user station with multiple process modules performs the user-initiated alarm limit calculations.

In yet further embodiments, the operator may take actions based on the alarm, such as turning off or on of selected valves based on a monitored parameter reaching an operator specified limit. An operator may operate valves and motors manually or through normal process control interface software. Modes of control may also be changed, such as from manual to automatic or cascade, as well as modification to various PID control types.

The present invention provides the operator with an efficient method of monitoring selected parameters and being alerted when they reach desired values. It is intended to avoid inappropriate use of the alarm system and offload the operator from having to remember to monitor parameters, and what levels to trigger key events. This is done on a temporary basis as controlled by the operator. In addition, when operator work shifts change, it is much easier to bring the new operator up to speed simply by reviewing all operator initiated alarms.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
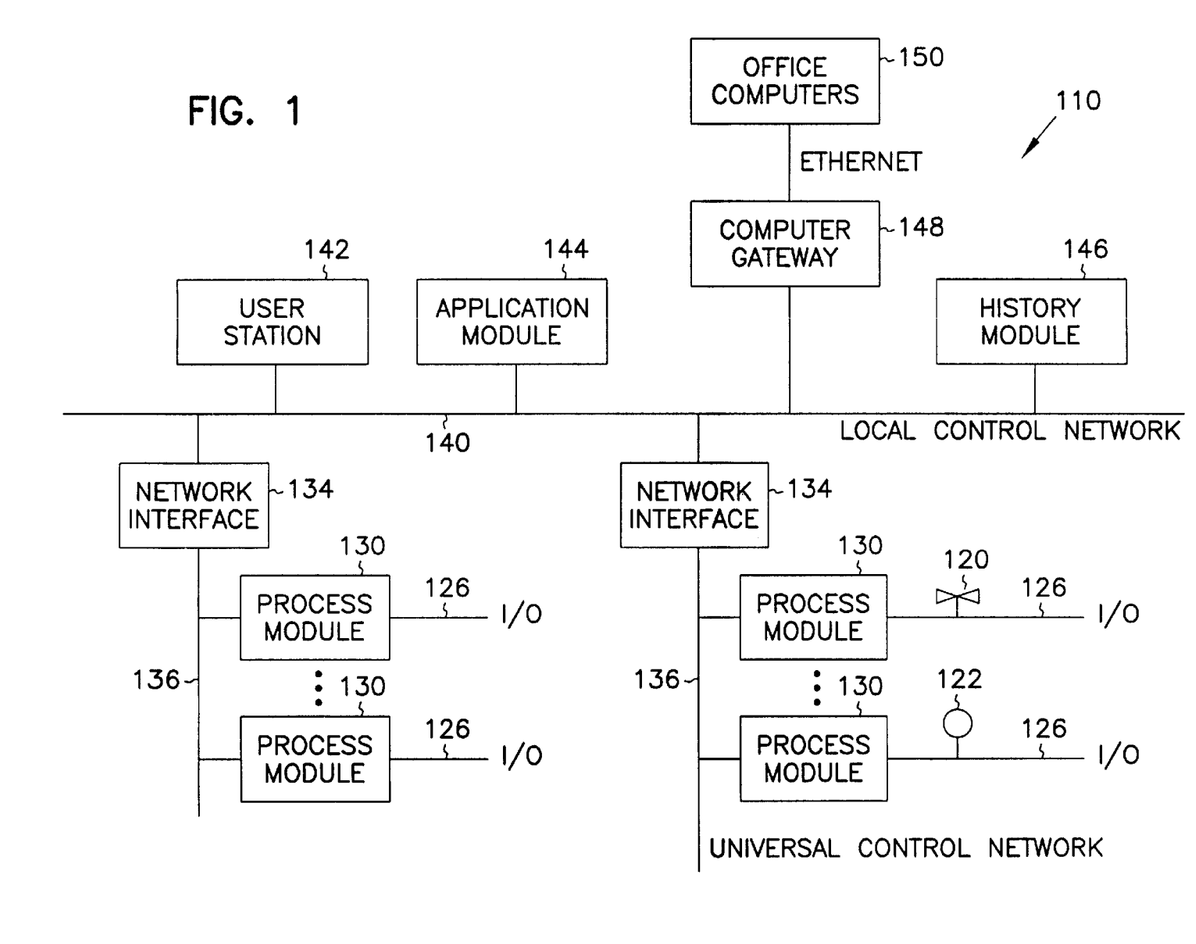
FIG. 1 is a block diagram representation of a distributed process control system.

A process control system is shown generally at 110 in FIG. 1. The process control system is of the distributed type such as a TDC and follow-on control systems made by Honeywell Inc. which has several processors which monitor the measured parameters, and provide process control signals to valves, pumps, motors, heaters and other devices which control the process being monitored. The control system may also comprise a single processor. Generally, such processes include the use of tanks, pumps, valves, motors and other devices 120 which operate together to manufacture or process materials. There are many types of sensors 122 that provide indications of physical parameters such as fluid flow, level, pressure and temperature. Each of the devices and sensors are coupled via I/O buses 126 to process modules 130. Each process module 130 monitors signals on an I/O bus 126 from multiple devices and sensors representative of parameters. In one embodiment, each device and sensor coupled to a process module 130 has a repeating time slot in which to communicate information associated with it. The information typically include a set point (SP), process variable (PV) representative of a sensed parameter, output percent (OP) representative of a control signal for a device, and deviation (DEV).

Each process module 130 then compares the parameters with predefined alarm limits set by engineers who designed and set up the process control system for the particular plant. These alarm limits are usually calculated to ensure safe operation of the plant. Each process module 130 is coupled to a network interface module 134 via a universal control network bus 136. Each network interface module 134 is coupled to a local control network 140 which multiplexes communications with several network interfaces 134. A user station 142 is also coupled to the local control network 140 and receives communications from the network interface modules 134 and displays the information to a user, who is usually one or more operators trying to monitor and perform procedures on the process being controlled. Other devices coupled to the local control network 140 include an application module 144 implementing advanced control functions. It is usually a high performance workstation. Also included is a history module 146 which records a history of the process being controlled, and a computer gateway 148 which is coupled to general office computers 150 via a common bus such as an ethernet bus.

Figure 2:
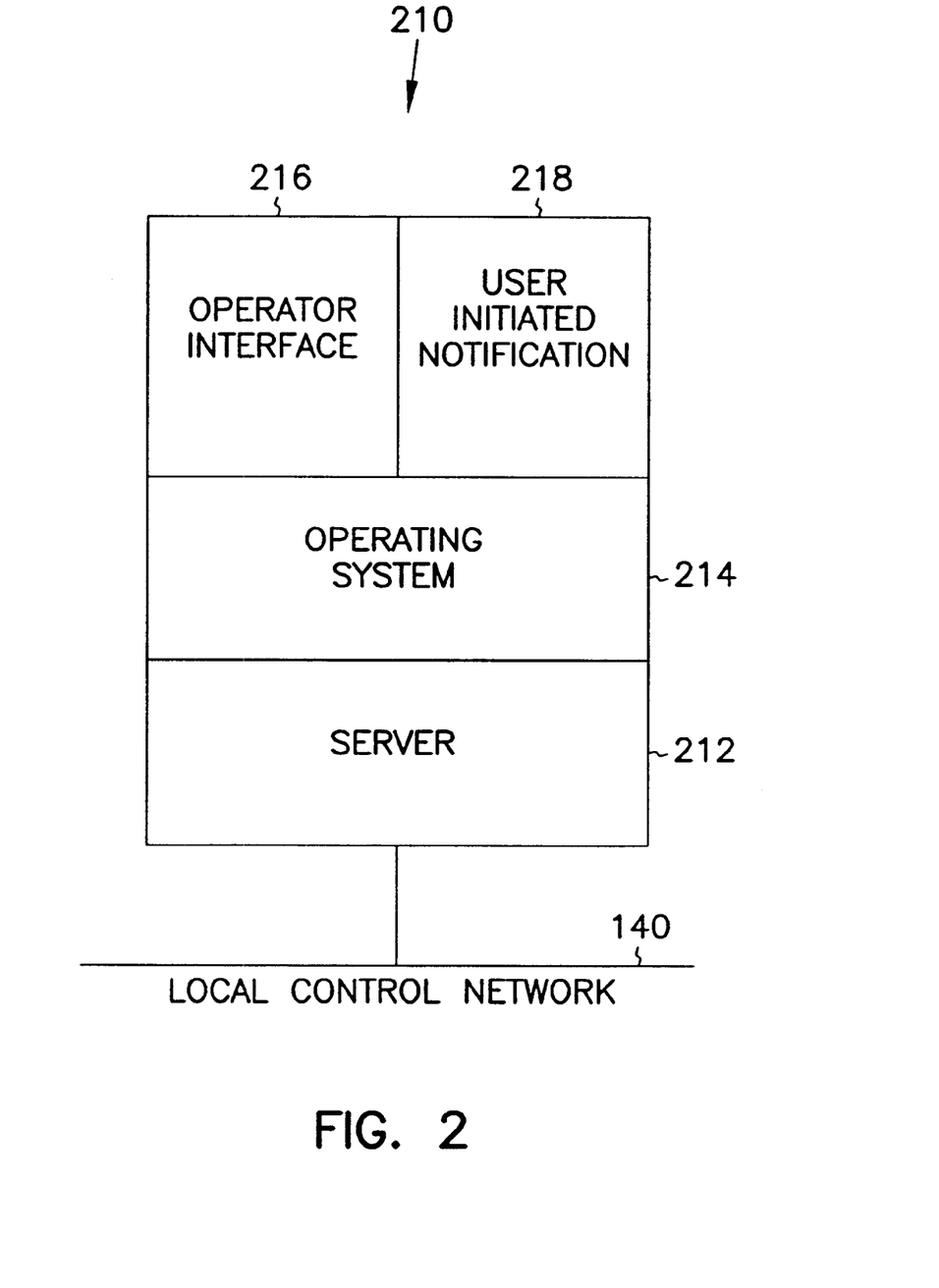
FIG. 2 is a block diagram representation of a user station used in the control system of FIG. 1.

Typically, the user station 142, as represented in block form in FIG. 2 at 210 is a Pentium compatible or PowerPC type processor coupled to a memory for running programs stored on the memory. The user station also comprises a server adapter 212 for connecting to the local control network 140. The user station 210 is typically running either a UNIX based or Windows NT based operating system 214 which has capability for providing multiple windows. Windows, or screens of data about the process being controlled are displayed on a CRT monitor by an operator interface program 216 running on top of the operating system 214. Such screens comprise lists of alarms, multiple schematics of the process, views of trends of selected parameters and overviews. Commands to control devices may also be issued as is well known in the art.

A further user-initiated alarm program 218 for providing an operator the ability to generate user-initiated alarms comprises either a separate module of the operator interface program 216, or a separate programming running directly on the operating system. It should be noted that programs can be implemented in many different forms to accomplish the same function, including different languages and can even be hardwired. In one embodiment, both programs 216 and 218 are run from the main memory of the user station. They may be loaded from any type of storage media, or transmitted electronically from other devices attached to the networks described herein, or from further external networks, such as the Internet which may be coupled to one of the office computers or any other computer with an external communication device such as a modem.

Figure 3:
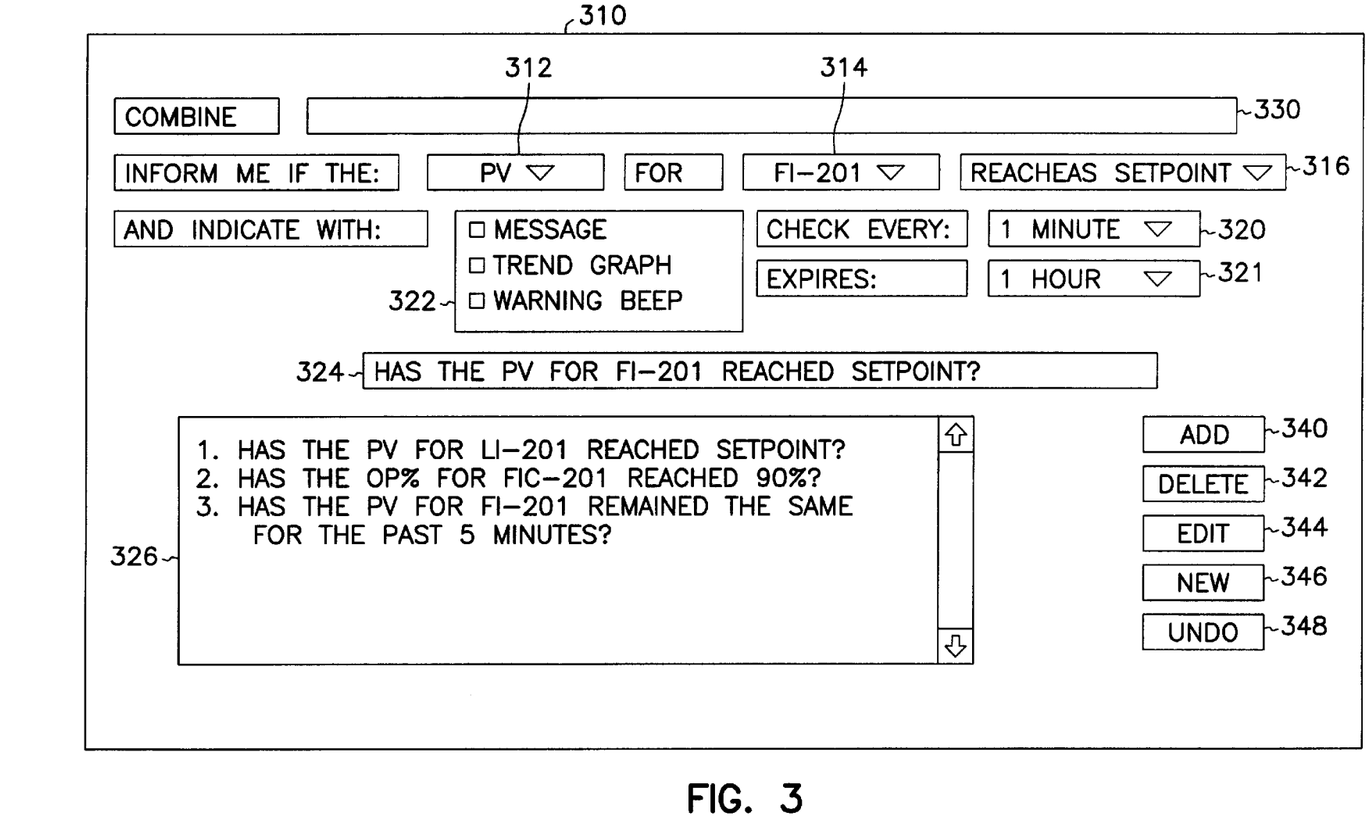
FIG. 3 is a block diagram representation of a user interface screen displayed on the user station of FIG. 2.

In one embodiment, a graphical user interface indicated generally at 310 in FIG. 3 is provided to the user to allow selection of parameters at a dialog box 312 for devices or sensors that are referred to as points in a dialog box 314 and to define a value in a dialog box 316. Note that some of the dialog boxes have a down pointing arrow which when selected, will show options for the box. The value in box 316 can be defined as a lower limit, a high limit, a set point, a particular number or other value. At dialog box 320, the operator can select a monitor time period or frequency at which the parameter is checked. A further dialog box 321 allows the user to indicate how long a user-initiated alarm should exist. At dialog box 322, the user can select the type of alarm generated when the event defined in boxes 312, 314, or 316 occurs. It can be by display of a message, a trend graph, or a warning beep. A dialog box 324 provides the operator with a default message which is editable by the operator to help in identification of the user-initiated alarm. It is displayed in a list in box 326 with other user-initiated alarms. In one embodiment, the user-initiated alarms are numbered. This allows for easy identification when performing logical operations on multiple user-initiated alarms in a dialog box 330. Dialog box 330 allows the entry of boolean logic statements when it is desired to trigger a user-initiated alarm when multiple events occur. In other words, using logical operators such as AND and OR, an operator could define two events, such as a tank being half full, AND the temperature of a fluid in the tank reaching 90 degrees Celsius. A user could easily write a statement such as "1 AND 2" meaning that both user-initiated alarms 1 and 2 in the list 326 must be true for the alarm specified to be communicated. Many types of events may be monitored as discussed later in the description. Upon an alarm being triggered, the operator may take various actions, such as the turning off or on of selected valves based on a monitored parameter reaching an operator specified limit. An operator may operate valves and motors manually or through normal process control interface software. Modes of control may also be changed, such as from manual to automatic or cascade, as well as modification to various PID control types.

Figure 4:
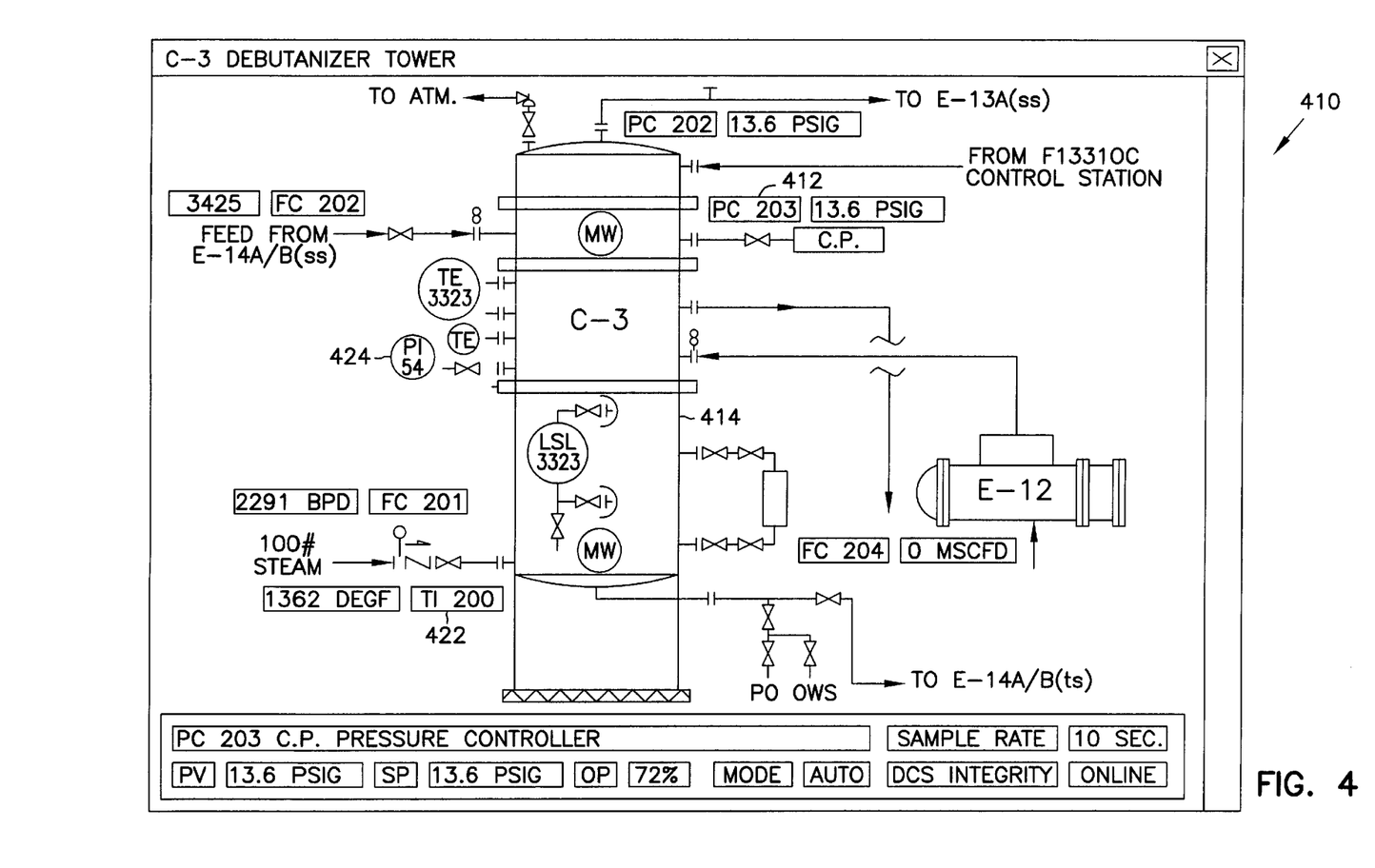
FIG. 4 is a block diagram of a schematic representation of a portion of a process being controlled by the distributed process control system of FIG. 1.

Interface 310 may be a screen that is always available and selectable such as via a task bar or other icon. One further alternative for reaching the interface 310 is provided in various schematic diagrams of the process being controlled such as indicated generally at 410 in FIG. 4. Points, such as devices and sensors are represented in a schematic form with icons, and are labeled to provide information useful in monitoring them. One such icon, pressure controller "PC 203" indicated at 412 is highlighted. The icons are selectable by cursor control devices. A single click on a mouse or other cursor control device, or via a touch screen will highlight the icon and present current information about the underlying point. In this case, the process value PV is 13.6 PSIG, and the set point SP is the same. The output OP is at 72%. Pressure controller "PC 203" at 412 is coupled to a vessel 414 and adjusts the pressure of fluid within the vessel. Other sensors, such as temperature indicator "TI 200" at 422 and pressure indicator "PI 54" at 424 provide process values PV representative of temperature and pressure respectively. When the icons for each are properly selected, such as a by double click on a mouse or other cursor control device, or via a touch screen interface, interface 310 is presented to the operator with information about the point already entered in the proper fields ready for defining a user-initiated alarm. This provides a time savings to the operator. It also helps prevent typographical errors, which can occur in an abnormal situation where operator stress levels may be elevated.

When an operator defines a user-initiated alarm, program 218 generates a user-initiated alarm message identifying the point or group of points, the parameter or parameters, the value or action to apply, the type of alarm to communicate, and a time interval or frequency during which to check. The user-initiated alarm message is communicated through server 212, to the network interface modules 134, which contain lists of all the points attached to them. It is then forwarded over the universal control network 136 to the proper process module 130 which is coupled to the point or points identified. The process module 130 uses the information in the message to monitor the parameter for the point identified in accordance with the frequency during its sequential cycles of monitoring all the points attached to it. In one embodiment, the message only indicates a parameter for a point and a frequency for checking it, or a request that only changes be communicated. In this case, the process module only broadcasts the parameter and point identification back up through the universal control network and the local control network, where it is picked up by the server 212. Server 212 recognizes it as a point being monitored by the program 218, and forwards the message to the program 218. Program 218 then performs the comparisons and generates the proper alarms if the parameters specified exceed the limits selected. In a further embodiment, the message contains all the information required for the process module to perform the checking and alarm generation in the same manner as it currently performs predetermined alarm monitoring and communication of alarms. Changes to the control language in the process module are made to accommodate the checking of user-initiated alarm limits. The messaging described above may be performed with standard messaging services available with most operating systems having inter-process messaging.

Figure 5:
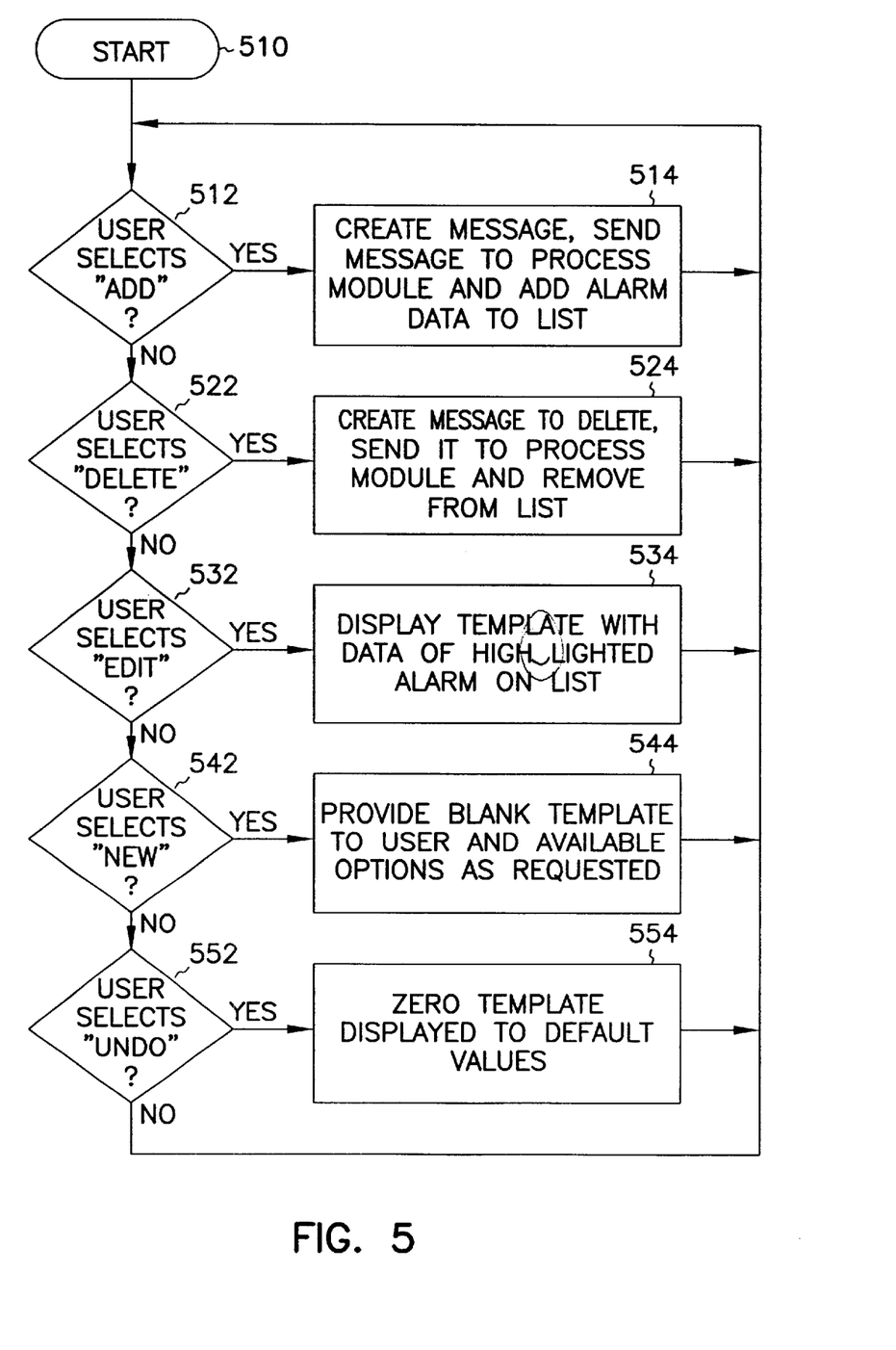
FIG. 5 is a flow chart representing program flow for a user to define and edit user-initiated alarms.

In the interface template 310, there are also a plurality of control boxes which can be selected by a user to perform various operations on a user-initiated alarm displayed in list 326. These include add 340, delete 342, edit 344, new 346 and undo 348. Their functions are shown in further detail in FIG. 5. FIG. 5 is a flow chart of operations performed by user-initiated alarm program 218 in response to these control boxes being selected by a user. Again, any type of cursor control device, even including a tab key, or touch screen may be used by an operator. The operations are started at 510 where the program waits for a user selection. When "add" is selected at 512, a message is created based on the information entered in the template dialog boxes of FIG. 3, and it is sent to one or more process modules. It is also added to a list of points being monitored. When "delete" is selected at 522, a message is created at 524 and sent to the process module to discontinue monitoring of the point, at least for purposes of the user-initiated alarm that was just deleted. In addition, the user-initiated alarm is removed from the list maintained by the program 218. Selecting the "edit" function at 532 results in a block 534 displaying the template with data from an alarm highlighted in the list 326. The operator is allowed to modify the information. When finished, the operator may select "add" and a new message will be created and sent, overwriting the earlier message. Selecting "new" at 542 causes a blank template to be provided at 544. Selecting "undo" at 552 causes the displayed template to be written with default values, which may include blanks at 554. Each of the execution blocks 514, 524, 534, 544, and 554 cause execution flow to return to the start 510 upon completing their tasks.

Figure 6:
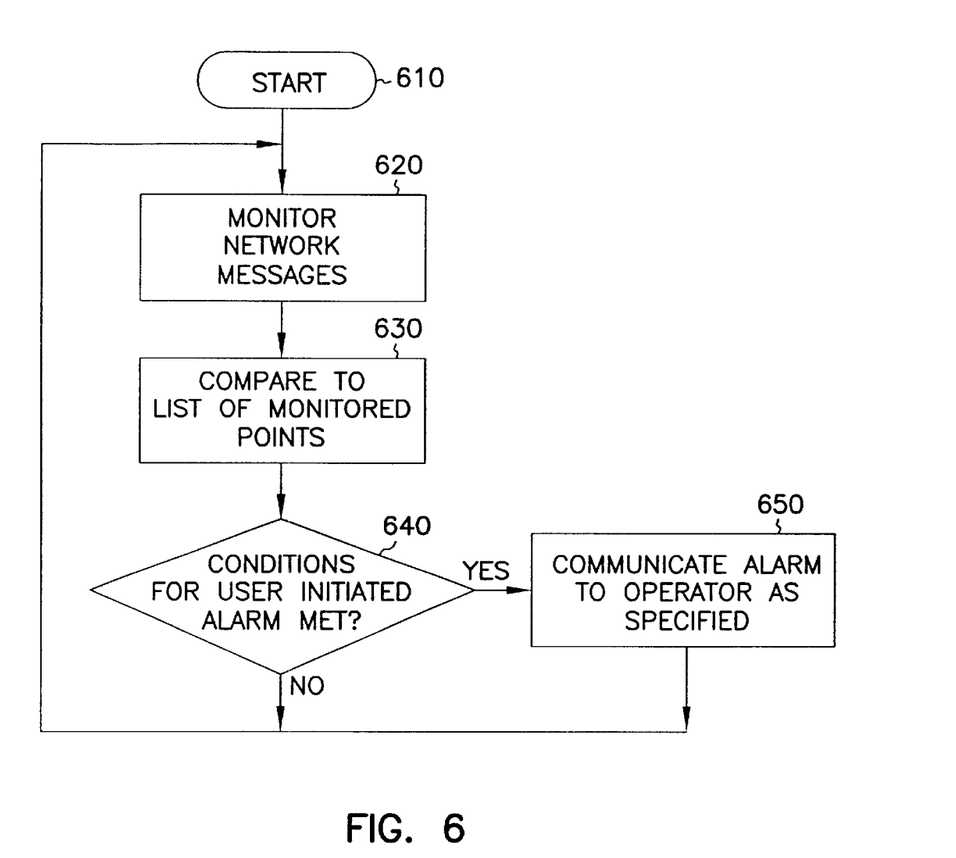
FIG. 6 is a flow chart representing program flow for monitoring of parameters and providing communication of user-initiated alarms.

Once one or more user-initiated alarms have been created, a part of user-initiated notification program 218 monitors the broadcast messages from the process modules and performs comparisons based on the list 326. In one embodiment, program 218 subscribes to messages broadcast from network interface modules 134. The monitoring portion of the program 218 is represented in flow chart format starting at 610 in FIG. 6. The network messages from the process modules are monitored at 620, and if a message is related to one of the user-initiated alarms, the information in the message is compared at 630 to the information from the template which generated the user-initiated alarm. If the conditions are met at 640, the specified alarm is provided at 650. If not, or following provision of the alarm, flow returns to monitor 620.

There are several types of user-initiated alarms, also referred to as monitors because they monitor values of parameters. A first type is a time based monitor, which simply monitors absolute time, elapsed time, or periodic time for notifying an operator at a periodic time interval, such as every 10 minutes. The periodic time monitor also has an expiration time in addition to specification of a message to use to indicate the time has elapsed. Event based monitors are the type described above. They notify operators when an event occurs in the process. This allows operators to specify event conditions that they need to monitor. Awareness of these event conditions facilitate monitoring by notifying the operator when a specified event has happened rather than having the operator continually check on the relevant parameters or monitor the alarm system. Event based monitors comprise analog constant, analog relational, digital state change constant, digital state change relational, process flag state change constant, and process flag state change relational.

Analog constant monitors notify the user when a process parameter reaches a user specified value. An example is: "Notify me when the PV of FI501 (Flow Indicator 501) is equal to 50." The information entered by an operator to set this alarm is a message, point name (FI501), process parameter value (SP (Set Point), PV (Process Variable), OP (Output), DEV (Deviation)), numerical value and comparators such as equal to, greater than, less than, more than x away from and within x of. Error checking comprises verifying that the process parameter value entered is not outside the actual limits for that parameter. A message is provided requesting a new value if it is outside the range.

Analog relational monitors notify the user when a process parameter compared with another process parameter meets a user specified condition. An example is: "Notify me when the PV of FI501 is equal to the PV of FI507." The process variables compared may be different, such as PV compared to SP. The information entered to set the alarm is the same as above, but includes two point names and process parameter values. The error checking is also the same, but includes checking to see if the conditions specified is possible given the upper and lower limits for each parameter.

Information to be displayed for notification of analog monitors comprises the point names, current time, priority, description, trigger point, current PV, SP, OP, DEV, alarm limits, historical trend plot or plots, and a desired system action. The information may be varied as desired.

Digital states exist for devices that have an on or an off state, such as a pump. These states can be equated to logical True and False states suitable for use in Boolean logic equations. The digital state change constant monitor notifies the user when a piece of process equipment is in a user specified state. One example is: "Notify me when J-7 pump is off." The information used to set the alarm comprises a message, point name, process parameter value (OP), user specified state (on/off; manual/auto) and a comparator (equal to—to see if the current state is equal to the user specified state.

The digital state change relational monitor is used to notify a user when a process parameter compared with another process parameter meets a user specified condition. An example is: "Notify me when Pump 201 and Pump 305 are in the same state."

Process flag state change constant and relational monitors are used to notify the user when a process flag is equal to a particular Boolean value, or when two process flags are in the same state. Process flags comprise INALARM, HIFLAG, DEVHIFLAG and are logical conditions provided when an alarm point has been exceeded. The information associated with an alarm generated from such monitors comprises point name(s), current time, priority, description, trigger state, current state, DEV, alarm limits and system action.

A further type of monitor comprises across-monitor conditional notifications which allow operators to monitor multiple areas and situations of interest at the same time. This is intended to further reduce the cognitive overhead of monitoring by allowing users to cluster important activities and situations, and having the system remind them of important tasks and also notify them when events of interest occur. This type of monitor notifies the user when a condition has been met after comparison of multiple monitors. For example, "notify the user when either FI205>50 OR Time= 2:30 PM." As seen earlier, this condition can also be specified by the logical combination of existing monitors, such as "1 OR 2." Logical operators AND, OR and XOR provide sufficient flexibility. Error checking involves checking the individual monitors for validity and notifying the user if the monitors are invalid.

User-initiated notifications have some attributes which are useful, such as time to trigger. This specifies the time period for which a user-defined event must be continuously true in order for the monitor to trigger. The time dimension is specified in minutes. Note, this attribute is a characteristic of the analog notification types. Monitor activation requirements defined by the user specify when the monitor will start. Options include now, date and time in the future, and event based (e.g., if a point comes out of alarm, start monitoring the level.)

Monitor trigger conditions are used to specify what happens when a user-initiated notification is triggered. In one case, the user and others are simply notified about the occurrence of the event. In a second case, an action is taken. The action may be pre-defined with authorization to take the action, or request authorization and confirmation prior to execution of the action. Typical actions comprise changing a SP, changing a process equipment mode such as turning on a pump or changing its state to manual or automatic, and activating another monitor.

Several capabilities are available to make the setting, editing, and management of alarms easier and secure for an operator. The following list of capabilities and their descriptions are not all inclusive, but represent the current state of the program 218.

Log-in Specify user name and password.

Create Notification Generate a new user-initiated notification. Attributes include a notification name, specification of storage location such as a directory, and specification of access rights based on the log-in capability.

Create Directory Generate a user-defined notification directory.

Define Specify relevant attributes and properties of a user-initiated notification comprising: points, area, notification type, process parameter, priority, message (pre-defined or user entered), expiration, comparator, value of notification trigger point (e.g., digital, analog, Boolean, time basis), time to trigger, monitoring trigger conditions (action to be taken), system authorization level for alarm (do it or ask permission), update rate for real-time values, communicate value on change.

Activate/Inactivate Select and enable or disable notification for use in the system.

Modify Edit or change the attributes or properties of a previously saved user-initiated notification. This includes changing of object names and properties.

Save Saves notification to the system upon creation or edit.

Filter/Sort Transforms the view of the user-initiated notification to a user specified ordering such as one based on priority, type, alphabetically, date, area, etc. A second type of filtering allows the operator to select points and parameters for building notification by reducing the possible matches.

Find Search for an instance based on a match of a user specified pattern.

Acknowledge Confirms receipt of a notification.

Forward Transfers data to another system such as a display or console.

Send/Reply Sends user-initiated messages and data to another system.

Copy Creates a duplicate of the current notification and its associated data in a different file without disturbing the original copy.

Notify Generates a message notification that a user-initiated event has occurred and that its status has changed based on the user defined conditions.

Trigger System takes a user defined action based on the trigger point condition being met and appropriate authorization existing or being provided upon prompting.

Delete eliminates a notification or notification directory with the intention of removing the information permanently.

View Displays notification information that supports viewing flexibility for notification status, available notification, and currently active notifications to allow the user to always see the currently active notifications. Modes of providing such information comprise a UIN icon, or messages on the alarm page, system message page, system journal page, status bar or UIN message page.

Move Transfers notification information from one location to another and allows for flexible visual organization of information.

Navigate Direct navigation to a relevant schematic, display, or context that is critical to the current notification.

It is to be understood that the above description is intended to be illustrative, and not restrictive. The functions provided by the system described are performed in discrete locations. One of ordinary skill in the art can easily shift the functions to other parts of the system without departing from the scope of the invention. Functions implemented in software may be performed by hardware in different locations, such as at the process modules, network interface modules, or even in the devices and sensors themselves as they become more intelligent. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A distributed industrial process control system having alarm limits predetermined by a process engineer, the distributed process control system comprising:

a plurality of sensors coupled to a plurality of I/O buses, that sense physical conditions and provide values of parameters on the I/O buses representative of the physical conditions;

a plurality of devices coupled to the I/O buses that control process flow responsive to set point parameters and output value parameters;

a plurality of process modules, each coupled to an I/O bus that receives values of parameters from the sensors and provides set point parameters to the devices, the process modules having predetermined alarm limits set therein for monitoring the values of parameters with respect to the predetermined alarm limits and generating alarms when such limits have been met;

a plurality of network interface modules coupled to the process modules and to a local control network that transfers alarms and parameters from the process modules to the local control network;

a user station coupled to the local control network that enables a process control system operator to generate user-initiated alarm limits related to current diagnostic needs for one or more sensors and devices independent of the predetermined alarm limits, and that communicates information related to the user-initiated alarm limits to the process modules to direct the process modules to provide selected parameter values to the user station, and wherein the user station compares the parameter values to the user-initiated alarm limits and generates an alarm when the limits have been satisfied;

wherein the alarm generated by the user-initiated alarm limit indicates that an operator-selected parameter has reached an operator-defined limit.

2. A distributed process control system having alarm limits predetermined by a process engineer, the distributed process control system comprising:

a process module coupled to a plurality of points to be monitored, said process module having a predetermined alarm limit set therein, and a monitor that compares a value of a parameter representative of the point against the predetermined alarm limit wherein the monitor generates a predetermined alarm when the predetermined alarm limit is exceeded; and a user interface module that enables an operator to set user-initiated alarm limits independent of the predetermined alarm limits, wherein user-initiated alarms are generated when the user-initiated alarm limits are exceeded.

3. The distributed process control system of claim 2 wherein the user interface controls the process module to provide the value of the parameter to the user interface on a periodic basis.

4. The distributed process control system of claim 3 wherein the value of the parameter is provided to the user interface only when it changes from a previous value.

5. The distributed process control system of claim 2 wherein the user interface module enables the operator to specify a type of alarm to be provided when the user-initiated alarm limit is satisfied.

6. The distributed process control system of claim 5 wherein the type of alarm is selected from the group consisting of a message, a sound and a trend graph.

7. The distributed process control system of claim 2 wherein the user interface comprises a template having spaces for filling in data.

8. The distributed process control system of claim 7 wherein the spaces have indications of acceptable data associated therewith.

9. The distributed process control system of claim 8 wherein the indications comprise drop down menus which provide alternatives for the data to be inserted therein.

10. The distributed process control system of claim 7 wherein the spaces comprise a point identifier, a parameter identifier and a limit specifier.

11. The distributed process control system of claim 2 wherein the user interface module provides the operator the ability to logically combine multiple user-initiated alarm limits with respect to multiple parameters and provide an alarm based on such combination being satisfied.

12. A method of providing user-initiated alarms in a distributed process control system having a plurality of points with alarm-limits predetermined by a process engineer wherein predetermined alarms are provided when the predetermined alarm limits are exceeded, comprising the steps of:

provitating an operator of the distributed process control system the ability to identify a point and an associated parameter, and to set a user-initiated alarm limit with respect to an operator-defined value of the parameter independent of the predetermined alarm limits;

monitoring the parameter;

providing an alarm when the parameter has reached the user-initiated alarm limit; and providing the operator the ability to specify a type of alarm to be provided.

13. The method of claim 12 and further comprising the step of providing the operator the ability to logically combine multiple user-initiated alarm limits with respect to multiple parameters.

14. The method of claim 12 and further comprising the step of providing the operator with a template having spaces for filling in data related to the user-initiated alarm limits.

15. The method of claim 14 and further comprising the step of providing drop down menus associated with the spaces.

16. The method of claim 15 wherein the drop down menus provide alternatives for the data to be inserted in the spaces.

17. A distributed process control system having alarm limits predetermined by a process engineer, the distributed process control system comprising:

a plurality of points that measure parameters representative of the physical state of the process being controlled and provide values of the parameters;

a process module coupled to the points to receive the values, said process module having predetermined alarm limits set therein, and a monitor that compares the values with the predetermined alarm limits wherein the monitor generates predetermined alarms when the predetermined alarm limits are exceeded;

a user interface module coupled to the process module that enables an operator to set user-initiated alarm limits to indicate that an operator-selected parameter has reached an operator-defined value independent of the predetermined alarm limits, wherein the process module provides the values to the user interface in response to the user-initiated alarm limits being set, wherein user-initiated alarms are generated when the user-initiated alarm limits are exceeded, wherein the user interface module generates a message to be sent to the process module with sufficient data to enable the process module to provide the values to the user interface.

18. An industrial process control system comprising:

a plurality of devices and sensors, each having parameter values which vary with time and predetermined alarm limits set by a process engineer with respect to the parameters; and a monitor, coupled to the devices and sensors that receives the parameter values and compares them to user-initiated alarm limits which are independent of the predetermined alarm limits, wherein the monitor provides a user-initiated alarm if the parameter value reaches the user-initiated alarm limit, wherein the monitor compares the parameter values to the user-initiated alarm limits periodically as specified by the operator.

19. A storage medium having a computer program stored thereon for causing a suitably programmed system to provide user-initiated alarms in a distributed process control system having a plurality of points with predetermined alarm limits set by a process engineer wherein predetermined alarms are provided when the predetermined alarm limits are exceeded, by performing the following steps when such program is executed on the system:

providing an operator of the distributed process control system the ability to identify a point and an associated parameter, to set a user-initiated alarm limit with respect to an operator-defined value of the parameter independent of the predetermined alarm limits;

monitoring the parameter;

providing an alarm when the parameter has reached the user-initiated alarm limit; and providing the user with the ability to specify the type of alarm to be provided.

20. The storage medium of claim 19 wherein the computer program comprises programming for further causing the system to perform the following additional steps when such program is executed on the system:

providing the operator with a template for defining a user-initiated alarm from a display representative of the process being controlled when the operator selects a point on the display.

21. The storage medium of claim 20 wherein the computer program comprises programming for further causing the system to perform the following additional steps when such program is executed on the system:

providing the template partially filled in with point relevant information when selected from the display, and wherein the display representative of the process being controlled is selected from the group of displays comprising a schematic, a trend chart, a group of points and a list of points.

22. The storage medium of claim 19 wherein the computer program comprises programming for further causing the system to perform the following additional steps when such program is executed on the system:

generating a message representative of the user-initiated alarm; and sending the message to a controller which is coupled to the point for monitoring of the parameter.

23. The storage medium of claim 22 wherein the computer program comprises programming for further causing the system to perform the following additional steps when such program is executed on the system:

receiving messages broadcast from the controller representative of the parameter being monitored.

* * * * *